United States Patent
Lim

(10) Patent No.: US 6,456,948 B1
(45) Date of Patent: Sep. 24, 2002

(54) METHOD OF GENERATING DATA FOR USE IN MONITORING AND CONTROLLING CHARGE AND DISCHARGE STATUS OF SECONDARY BATTERY

(75) Inventor: Sung-bin Lim, Cheonan (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/517,531

(22) Filed: Mar. 2, 2000

(30) Foreign Application Priority Data

Apr. 21, 1999 (KR) ............................................. 99-14266

(51) Int. Cl.[7] .......................... G01R 31/36; H02J 7/00
(52) U.S. Cl. ........................................ 702/63; 320/134
(58) Field of Search .......................... 702/63; 713/300, 713/340; 320/128, 134

(56) References Cited

U.S. PATENT DOCUMENTS

| 5,218,288 | A | | 6/1993 | Mickal et al. |
| 5,341,084 | A | * | 8/1994 | Gotoh et al. |
| 5,394,089 | A | * | 2/1995 | Clegg |
| 5,545,969 | A | * | 8/1996 | Hasegawa |
| 5,563,496 | A | * | 10/1996 | McClure |
| 5,600,229 | A | * | 2/1997 | Oh |
| 5,617,324 | A | * | 4/1997 | Arai |
| 5,895,440 | A | | 4/1999 | Proctor et al. |
| 6,157,169 | A | * | 12/2000 | Lee |

FOREIGN PATENT DOCUMENTS

| EP | 448745 A1 | 10/1991 |
| EP | 711016 A2 | 5/1996 |
| EP | 736951 A2 | 10/1996 |

* cited by examiner

*Primary Examiner*—Judy Nguyen
(74) *Attorney, Agent, or Firm*—Leydig, Voit & Mayer, Ltd.

(57) ABSTRACT

A method of generating data for use in monitoring and controlling the charge status and discharge status of a secondary battery, which is carried out by a microcomputer installed in a secondary battery pack. The data generating method includes calculating a discharge capacity iteratively. The calculated discharge capacity is added to a required full charge capacity determined in a previous period of time, and the sum is determined as a required full charge capacity for each iteration. Also, if an average voltage value for each iteration for the secondary battery is less than a lower limit of the full discharge voltage value, a reference full charge capacity is updated with the required full charge capacity for each iteration.

4 Claims, 6 Drawing Sheets

METHOD OF GENERATING DATA FOR USE IN MONITORING AND CONTROLLING CHARGE AND DISCHARGE STATUS OF SECONDARY BATTERY

BACKGROUND OF THE INVENTION

1. Field of the Invention

The present invention relates to a method of generating data for use in monitoring and controlling the charge and discharge status of a secondary battery, and more particularly, to a method of generating data, by a microcomputer installed in a secondary battery pack and transferred to an external device.

2. Description of the Related Art

The advent of portable electronic devices such as notebook computers, camcorders and cellular phones has enabled the development of secondary batteries. In order to recharge a secondary battery, data for use in accurately monitoring and controlling the charge and discharge status of the secondary battery are required. Also, because a reference full-charge capacity, which is essential to calculate the data, substantially changes over time, is necessary to periodically monitor and update the reference full-charge capacity to generate such data.

For this reason, secondary battery packs have adopted a microcomputer and a peripheral circuit for generating data used to monitor and control the charge and discharge status. In a conventional algorithm programmed in the microcomputer, which is installed in the secondary battery, the reference full-charge capacity of the secondary battery is periodically updated through a learning process performed during charging of the secondary battery. That is, the conventional algorithm calculates a real full-charge capacity, which is proportional to the rate of charging of the secondary battery, and designates the calculated real full-charge capacity as a reference full-charge capacity.

However, since the charging properties of the secondary battery do not abruptly change over time, the algorithm performed by a microcomputer installed in the conventional secondary battery pack cannot be considered as a good algorithm which well reflects the operating properties of secondary batteries. Thus, the degree of accuracy in data associated with the reference full-charge capacity is lowered. In addition, the conventional algorithm determines the charging voltage value using only a read instantaneous voltage value, thereby further lowering the accuracy of data.

SUMMARY OF THE INVENTION

An object of the present invention is to provide a method of generating data for use in monitoring and controlling the charge and discharge status of a secondary battery, in which the operating properties of the secondary battery are accurately reflected.

In an aspect of the present invention, there is provided a method of generating data for use in monitoring and controlling the charge status and discharge status of a secondary battery, which is performed by a microcomputer installed in a secondary battery pack, the method comprising: periodically calculating and updating an average voltage value "adadvol" of the secondary battery; selecting and executing a charge mode, a discharge mode, a self-discharge mode according to the amplitude and sign of an instantaneous current "adcur" flowing through the secondary battery; when the discharge mode is iteratively performed, periodically calculating discharge capacity "DCR" and updating a required full charge capacity "s_dcr" with the calculated result; and if the average voltage value "avadvol" for the present period of time drops below a lower limit of a full discharge voltage value "s_edv0", updating a reference full charge capacity "f_c_capac" with the required full charge capacity "s_dcr".

In the data generating method according to the present invention, the reference full charge capacity "f_c_capac" is updated with the required full charge capacity "s_dcr" obtained in a discharge mode. That is, the discharging properties of the secondary battery, which, in contrast to the charging properties, sharply change with time, are reflected in the reference full charge capacity "f_c_capac", so that the charge status and discharge status of the secondary battery can be monitored and controlled with accurate data. Also, the charge status of the secondary battery is determined using the average voltage value of the secondary battery, and thus more accurate data can be generated.

BRIEF DESCRIPTION OF THE DRAWINGS

The above objects and advantages of the present invention will become more apparent by describing in detail a preferred embodiment with reference to the attached drawings in which.

DESCRIPTION OF THE PREFERRED EMBODIMENTS

Figure 1:
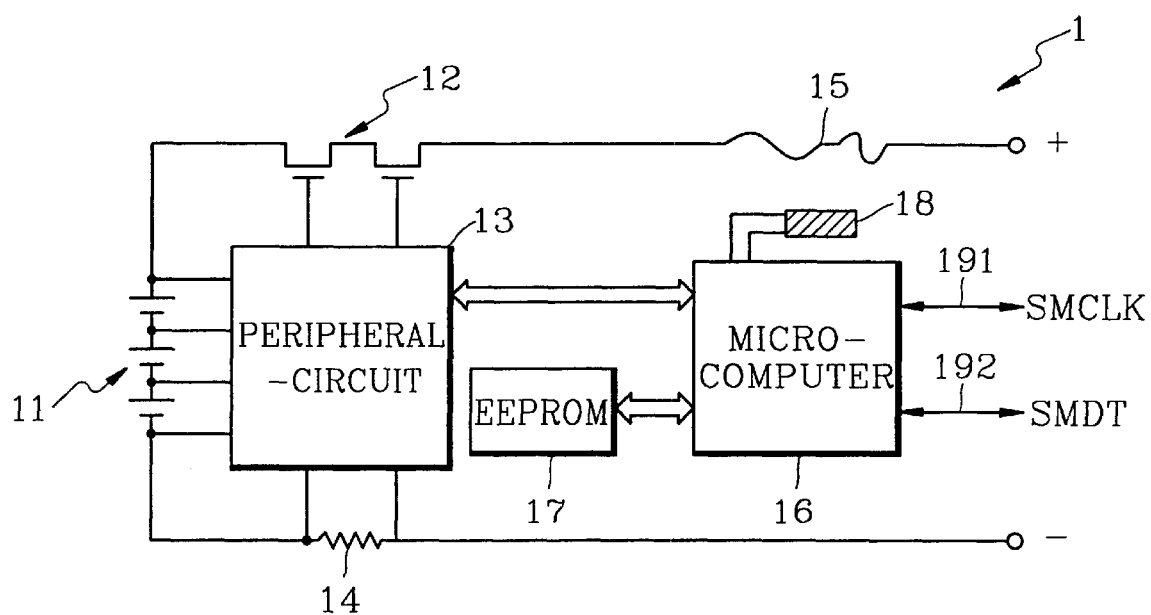
FIG. 1 is a diagram showing the inner structure of a secondary battery pack adopting an algorithm according to the present invention.

In FIG. 1, which shows the inner structure of a secondary battery pack adopting an algorithm according to the present invention, the secondary battery pack 1 includes a secondary battery 11, field effect transistors (FETs) 12, a peripheral circuit 13, a resistor 14, a protection element 15, a microcomputer 16, an electrically erasable and programmable read only memory (EEPROM) 17, and a thermistor 18. The FETs 12 are turned on or off in response to a control signal from the peripheral circuit 13, and control the charge and discharge status of the secondary battery 11. The peripheral circuit 13 measures an instantaneous voltage of the secondary battery 11, and an instantaneous current of the secondary battery 11 by measuring the current flowing through the resistor 14. Also, the peripheral circuit 13 turns the FETs 12 on or off according to a control signal from the microcomputer 16. The protection element 15 is for preventing over charging and over discharging, which may occur when the FETs 12 do not operate normally.

The microcomputer 16, which performs the algorithm according to the present invention, receives the instantaneous voltage and the instantaneous current from the peripheral circuit 13 and surrounding temperature from the thermistor 18, and generates data for use in monitoring and controlling the charge status and discharge status of the secondary battery 11. Here, the status controlling data is transferred to the peripheral circuit 13 and the status monitoring data is transferred to a notebook computer through serial communication lines. In FIG. 1, reference character SMCLK represents a clock signal and reference character SMDT represents a data signal.

Figure 2:
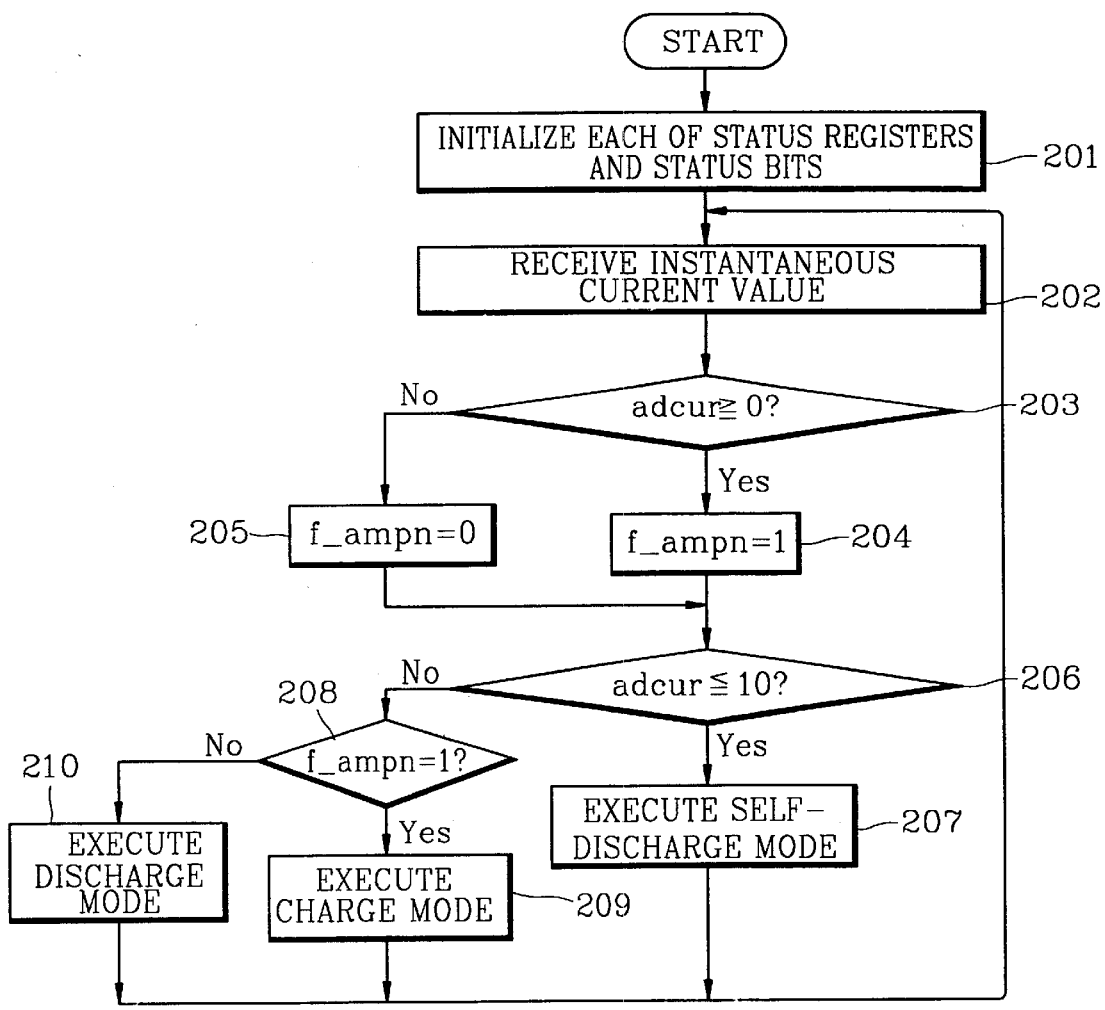
FIG. 2 is a flowchart illustrating the primary algorithm of a microcomputer installed in the secondary battery pack of FIG. 1 according to a preferred embodiment.

FIG. 2 shows the primary algorithm of the microcomputer 16 shown in FIG. 1 according to a preferred embodiment of the present invention. For the algorithm to be described below, it is assumed that a step of continuously calculating and updating an average voltage value "avadvol" of the secondary battery 11 (see FIG. 1) for a predetermined period of time is incorporated. Since the charge status is determined using the average voltage value "avadvol", more accurate data can be obtained.

Referring to FIG. 2, status registers and status bits in the microcomputer 16 are initialized in step 201. Then, according to the amplitude and sign of an instantaneous current value "adcur" flowing through the secondary cell 11, a charge mode, a discharge mode or a self-discharge mode, is performed (steps 202 through 210). Then, the steps 202 and 210 are iterated.

In particular, the instantaneous current value "adcur" is received (step 202). If the instantaneous current value "adcur" is greater than or equal to 0 mA(milliampre), a charge/discharge information bit "f_ampin" is set to 1 so that a charge mode is indicated. Otherwise, the charge/discharge information bit "f_ampin" is set to 0 so that a discharge mode is indicated (steps 203 through 205). Then, it is determined whether the instantaneous current value "adcur" is less than or equal to 10 (step 206). If the instantaneous current value "adcur" is less than or equal to 10 mA, the self-discharge mode is carried out (step 207). The self-discharge mode means a discharge mode without operation of an application system by the battery. Otherwise, a determination is made as to whether the charge/discharge information bit "f_ampn" is equal to 1 (step 208). If the charge/discharge information bit "f_ampn" is equal to 1, the charge mode is carried out (step 209). However, if the charge/discharge information bit "f_ampn" is not equal to 1, the discharge mode is carried out (step 210).

Figure 3:
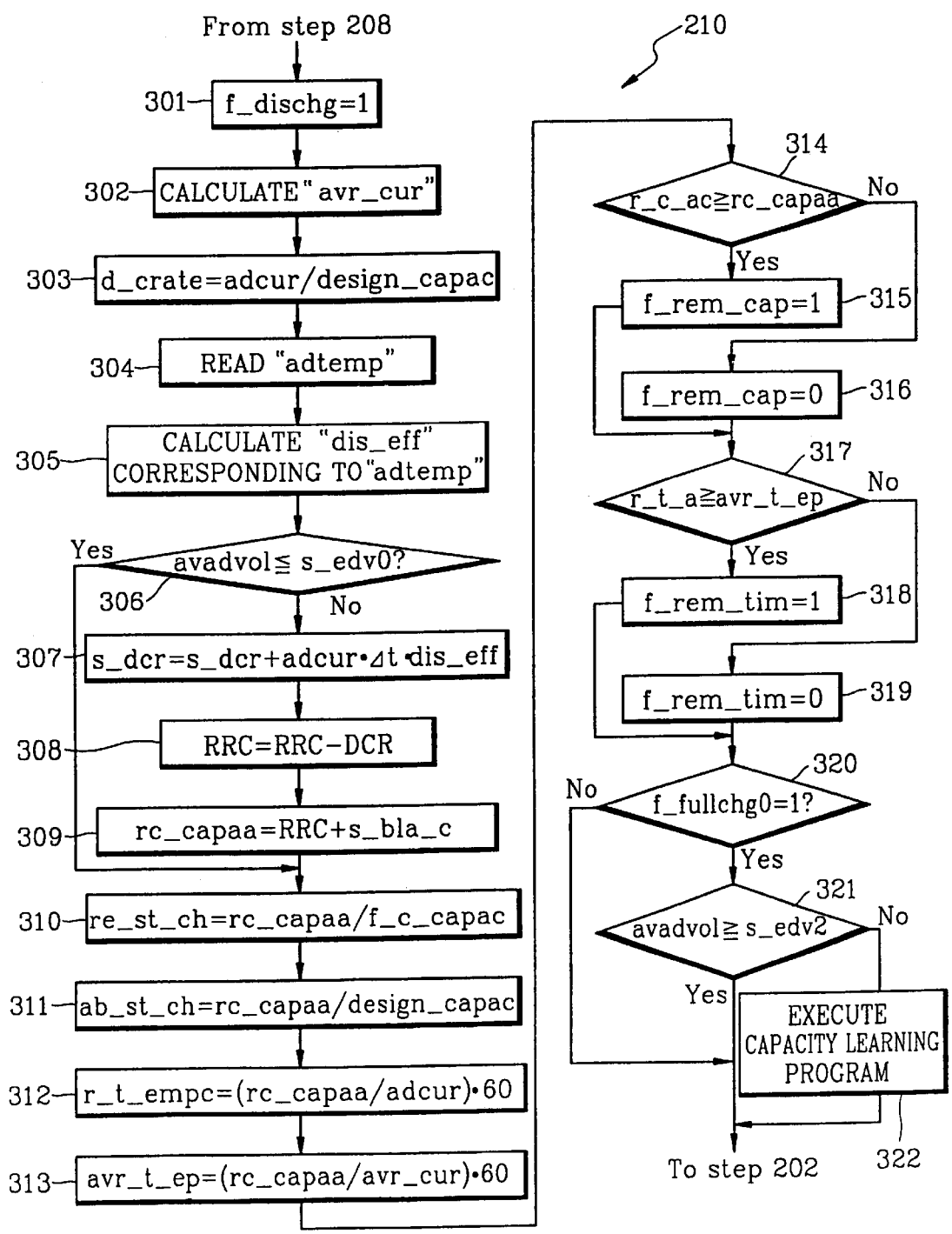
FIG. 3 is a flowchart illustrating an executable program for a discharge mode of the primary algorithm of FIG. 2.

FIG. 3 illustrates the execution program for the discharge mode, corresponding to the step 210 of FIG. 2, according to the present invention. The execution program for the discharge mode includes calculating a discharge efficiency "dis_eff" (steps 304 and 305), calculating a discharge capacity "DCR" (a sub-step of step 307), updating a required full charge capacity "s_dcr" (step 307) and updating a reference full charge capacity "f_c_capac" (step 322).

In the steps 304 and 305, the discharge efficiency "dis_eff" at the present temperature "adtemp" of the secondary battery 11 is calculated. More particularly, the discharge efficiency "dis eff" is chosen from recorded data which are acquired from experiments and simulations according to discharge rate "d crate", present temperature "adtemp", and the number of total full discharges "ccount" (Refer to FIG. 5). In the step 307, the discharge capacity "DCR" is calculated as the product of the instantaneous current value "adcur", elapsed time "Δt", and the discharge efficiency "dis_eff". In the first period of the discharge mode, the elapsed time "Δt" is counted from the starting time of the first discharge to a time point in the step 307. However, in other periods of the discharge mode, the elapsed time "Δt" is counted from the time point in the step 307 of previous period to the time point in the step 307 of present period. Then, in the step 307, the discharge capacity "DCR" is added to the required full charge capacity "s_dcr" determined in the preceding period of time. The required full charge capacity "s_dcr" for the present period of time is updated with the sum result. When the discharge mode is iteratively performed, the required full charge capacity "s_dcr", for a present period of time is periodically updated by the adding the discharge capacity, "DCR" (Refer to FIG. 2 and the step 307 of FIG. 3). In the step 322 of updating the reference full charge capacity "f_c_capac", if the average voltage "adadvol" of the secondary battery 11 for the present period of time is lower than a lower limit of the full discharge voltage value "s_edv0", the reference full charge capacity "f_c_capac" for the present period of time is updated to be equal to the required full charge capacity "s_dcr" for the present period of time, using a capacity learning program.

In the data generating method according to the present invention, the reference full charge capacity "f_c_capac" is updated to be equal to the required full charge capacity "s_dcr" which is calculated during the discharge mode. That is, the discharging properties, which change rapidly over time, are considered in setting the reference full charge capacity "f_c_capac", so that the charge status and discharge status of the secondary battery 11 can be accurately monitored and controlled with the data.

Hereinafter, the execution program for the discharge mode (step 210) of FIG. 3 will be described in greater detail. In particular, the step 301 sets the discharge information bit "f_dischg" to 1, to indicate the discharge mode. Then, an average current "avr_cur" flowing through the secondary battery 11 for a given period of time is calculated (step 302). Then, the present current "adcur" is divided by a designated rated charge capacity "design_capac", resulting in a discharge rate "d_crate" (step 303). The present temperature "atemp" is read (step 304), and the discharge efficiency "dis_eff" at the read present temperature "atemp" is calculated (step 305). If the average voltage value "avadvol" is less than or equal to the lower limit of the full discharge voltage value "s_edv0" (step 306), the process moves to the step 310.

Otherwise, in the step 307, the calculated discharge capacity DCT is added to the required full charge capacity "s_dcr", which is determined in the preceding period, and the required full charge capacity "s_dcr" for the present period of time is updated with the sum result. In the step 308, the discharge capacity "DCR" is subtracted from the real remaining capacity "RRC" for the preceding period of time, and the real remaining capacity "RRC" for the present period of time is updated with the subtraction result. In the step 309, the real remaining capacity "RRC" for the present period is added to a designated disuse capacity "s_bla_c", and an estimated remaining capacity "rc_capaa" for the present period is updated with the sum.

In the step 310, the estimated remaining capacity "rc_capaa" is divided by the reference full charge capacity "f_c_capac", and then a relative remaining rate "re_st_ch" is updated with the result. The relative remaining rate "re_st_ch" can be supplied to a user. Then, the estimated remaining capacity "rc_capaa" is divided by the designated charge capacity "design_capac", and an absolute remaining rate "ad_st_ch" is updated with the result (step 311). The absolute remaining rate "ab st ch" can be used for preventing an error of the relative remaining rate "re_st_ch". The estimated charge capacity "rc_capaa" is divided by the read instantaneous current value "adcur" and a required time for being fully discharged (hereinafter, simply referred to as the first required full discharge time) "r_t_empc" is updated with the result (step 312). The first required full discharge time "r_t_e,c can be supplied to a user. Also, the estimated remaining capacity "rc_capaa" is divided by the average current value "avr_cur", and the second required full discharge time "aver_t_ea" is updated with the result (step 313). The second required full discharge time "avr_t_ep" is used at the step 317. The first required full discharge time "r_t_empc"(min) and the second required full discharge time "avr_t_ep"(min) are in units of minutes. Thus, in the steps 312 and 313, these discharge times are multiplied by 60 because the estimated remaining capacity "rc_capaa" (mA-h) is in units of hours.

If the estimated remaining capacity "rc_capaa" is less than or equal to an alarm remaining capacity "r_c_ac", a user is alerted that the charge capacity is very low (steps 314 and 315). Also, if an estimated full discharge time is shorter than or equal to a lower limit of the full discharge time "r_t_a", the user is alerted that it is near full (steps 317 through 319).

Then, it is determined whether to execute the capacity learning program using a maximum full charge bit "f_fullchg0" (step 320). Here, the maximum full charge bit "f_fullchg0" is set to 1 if the voltage level has once reached a maximum full charge voltage, and the maximum full charge bit "f_fullchg0" is updated with 0 after the step 322 of running the capacity learning program. Thus, if a logic value of the maximum full charge bit "f_fullchg0" is 0, which indicates that the capacity learning program has been performed, there is no need to run the capacity learning program as long as the system is reinitialized for example, the power is turned off.

Figure 4:
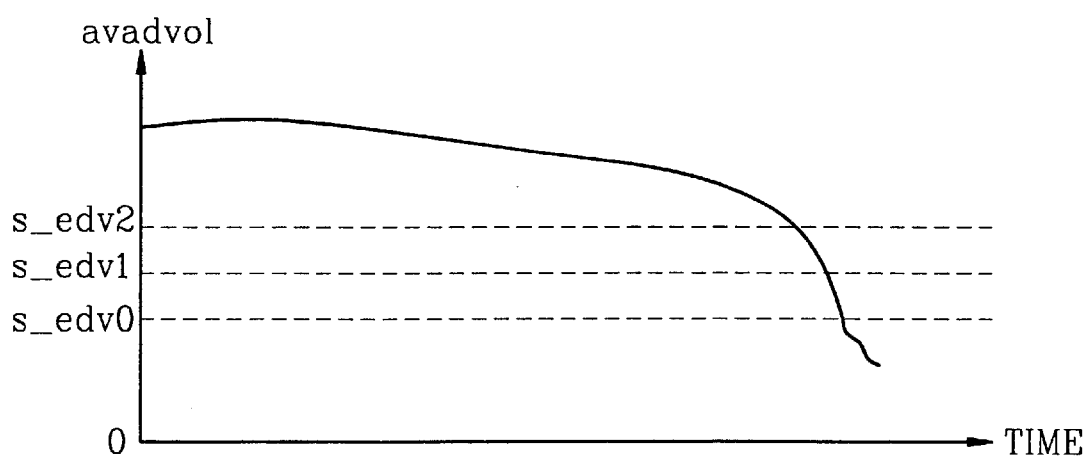
FIG. 4 is a graph showing voltage values used in running a capacity learning program of FIG. 3, for illustrating the discharging properties of a secondary battery.

If the maximum full charge bit "f_fullchg0" is equal to 1, it is determined whether the average voltage value "avadvol" is higher than or equal to a second full discharge voltage value "s_edv2" (step 321). The second full discharge voltage value "s_edv2" is set so as to determine whether to execute the capacity learning program (step 322). Referring to FIG. 4, in the step 322 of running the capacity learning program, three full discharge voltage values are used, including the lower limit of the full discharge voltage value "s_edv0", the first full discharge voltage value "s_edv1", which is higher than the lower limit of the full discharge voltage value "s_edv0", and the second full discharge voltage value "s_edv2", which is higher than the first full discharge voltage value "s_edv1". The reason for using three full discharge voltage values is to monitor the average voltage value of the secondary battery 11 (see FIG. 1) using the second and first full discharge voltage values "s_edv2" and "s_edv1", thereby minimizing the probability that the instantaneous voltage of the secondary battery 11 will drop below the threshold voltage of the system during the step 322 in running the capacity learning program.

Figure 5:
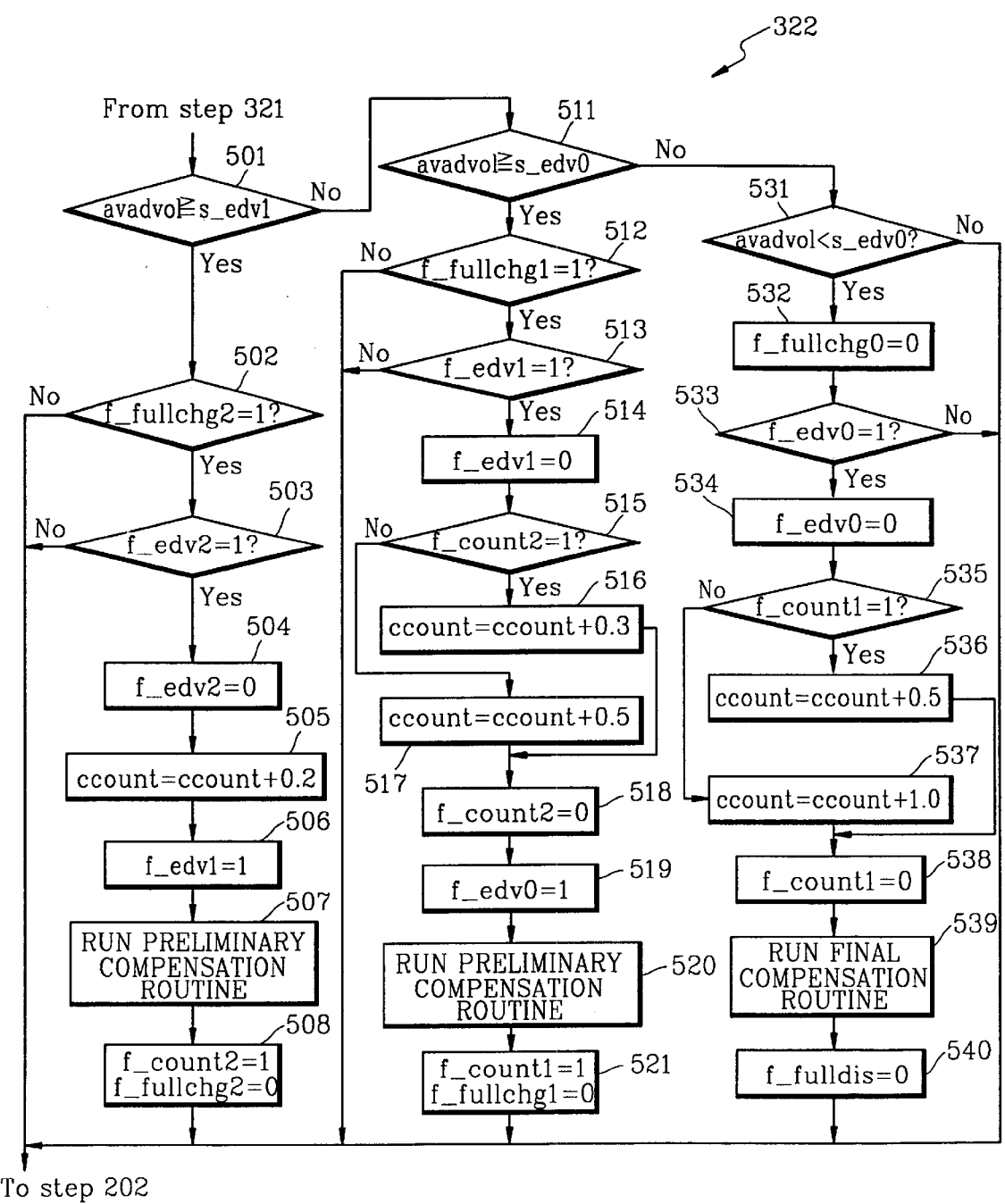
FIG. 5 is a flowchart illustrating running of the capacity learning program of FIG. 3.

FIG. 5 illustrates the capacity learning program (step 322) of FIG. 3. Referring to FIG. 5, a first capacity learning stage, from step 501 to step 508, is performed when the average voltage value "avadvol" of the secondary battery 11 (see FIG. 1) is lower than the second full discharge voltage value "s_edv2" and is higher than or equal to the first full discharge voltage value "s_edv1". A second capacity learning stage, from step 511 to step 521, is performed when the average voltage value "adadvol" of the secondary battery 11 is lower than the first full discharge voltage value "s_edv1" and is higher than or equal to the lower limit of the full discharge voltage value "s_edv0". Also, a final capacity learning stage, from step 531 to step 540, is performed when the average voltage value "adadvol" of the secondary battery 11 is lower than the lower limit of the full discharge voltage value "s_edv0".

In particular, in the first capacity learning stage, the average voltage value "adadvol" is compared to the first full discharge voltage value "s_edv1" (step 501). If the average voltage value "adadvol" is lower than the first full discharge voltage value "s_edv1", the process moves to the step 511. If the average voltage value "adadvol" is higher than or equal to the first full discharge voltage value "s_edv1", the logic state of a second full charge bit "f_fullchg2" is checked (step 502). If the logic value of the second full charge bit "f_fullchg2" is 1, step 503 is performed. Otherwise, the process returns to the step 202. In the case where the average voltage value "avadvol" has once reached the maximum full charge voltage, the second full charge bit "f_fullchg2" is set to "1". When the first capacity learning stage (from the steps 501 to 508) has been performed after the system is initialized, the second full charge bit "f_fullchg2" is updated with "0". Thus, when the logic value of the second full charge bit "f_fullchg2" is 0, there is no need to perform the first capacity learning stage as long as the system is reinitialized, for example, the power is turned off.

In the step 503, the logic stage of the second full discharge bit "f_edv2" is checked. If the logic value of the second full discharge bit "f_edv2" is equal to "1", the step 504 is performed. Otherwise, the process returns to the step 202. The second full discharge bit "f_edv2" is updated with "0" when the first capacity learning stage has been performed after the system is initialized (step 504). The number of total full discharges, "ccount" is incremented by 0.2 (step 505). In other words, since the average voltage value "avadvol" of the secondary battery 11 (see FIG. 1) enters the range between the second full discharge voltage value "s edv2" and the first full discharge voltage value "s_edv1", the remaining lifetime is updated taking into account the level of decreased capacity, which corresponds to the average voltage value "avadvol".

Following this, the first full discharge bit "f_edv1" is updated with 1 (step 506), and a preliminary compensation routine (step 507) is executed. The preliminary compensation routine (step 507) is the same as the other preliminary compensation routine (step 520) of the second capacity learning stages (steps 511 to 521), but it is different from a final compensation routine (step 539) of the final capacity learning stages (steps 530 to 540). After completion of the preliminary compensation routines (step 507), the logic value of a second compensation bit "f_count2" is updated with "1" and the logic value of the second full charge bit "f_fullchg2" is updated with "O" (step 508), and then the process returns to the step 202 of FIG. 2.

In the second capacity learning stage, first the average voltage value "avadvol" is compared to the lower limit of the full discharge voltage value "s_edv0" (step 51 1). If the average voltage value "avadvol" is lower than the lower limit of the full discharge voltage value "s_edv0", the process moves to the step 531. If the average voltage value "avadvol" is higher than or equal to the lower limit of the full discharge voltage value "s_edv0", the logic state of a first full charge bit "f_fullchg1" is checked (step 512). If the logic value of the First full charge bit "f_fullchg1" is 1, step 513 is performed. Otherwise, the process moves to the step 202. In the case where the average voltage value avadvol" has once reached the maximum full charge voltage, the first full charge bit "f_fullchg1" is set to "1". When the second capacity learning stage (from the steps 511 to 521) has been performed after the system is initialized, the first full charge bit "f_fullchg1" is updated with "0". Thus, when the logic value of the first full charge bit "f_fullchg1" is 0, there is no need to perform the second capacity learning stage as long as the system is reinitialized, for example, the power is turned off.

In the step 513, the logic state of the first full discharge bit "f_edv1" is checked. If the logic value of the first full discharge bit "f_edv1" is equal to "1", the step 514 is performed. Otherwise, the process returns to the step 202. The first full discharge bit "f_edv1" is updated with "0" when the second capacity learning stage has been performed after the system is initiated (step 514). Then, the logic value of the second compensation bit "f_count2" is checked (step 515). If the logic value of the second compensation bit "f_count2" is equal to "1", the number of total full discharges, "ccount" is incremented by 0.3 (step 516). However, if the logic value of the second compensation bit "f_count2" is not equal to "1", the number of total full discharges, "ccount" is incremented by 0.5 (step 517).

Following this, the logic value of the second compensation bit "f_count2" is reinitialized with "0" (step 518), and the final full discharge bit "f edv0" is updated with "1" (step 519). Then, the preliminary compensation routine (step 520) is executed. After completion of the preliminary compensation routine (step 520), the logic value of a first compensation bit "f_count1" is updated with "1" and the logic value of the first full charge bit "f_fullchg1" is updated with "0" (step 521), and then the process returns to the step 202 of FIG. 2.

In the final capacity learning stage, first the average voltage value "avadvol" is compared to the lower limit of the full discharge voltage value "s_edv0" (step 531). If the average voltage value "avadvol" is lower than the lower limit of the full discharge voltage value "s_edv0", the logic state of a maximum full charge bit "f_fullchg0" is updated with "0" (step 532). Then, the logic state of the final full discharge bit "f_edv0" is checked (step 533). If the logic value of the maximum full discharge bit "f_edv0" is "1", step 534 is performed. Otherwise, the process moves to the step 202. In the case where the final capacity learning stage (from the steps 531 to 540) has been performed after the initialization of the system, the final full discharge bit "f_edv0" is updated with "0" (step 534). Then, the logic value of the first compensation bit "f_count1" is checked (step 535). If the logic value of the first compensation bit "f_count1" is equal to "1", the number of total discharges "ccount" is incremented by 0.5 (step 536). However, if the logic value of the First compensation bit "f_count1" is not equal to "1", the number of total full discharges "ccount" is incremented by ⅕ (step 537).

Following this, the logic value of the first compensation bit "f_count1" is reinitialized with "0" (step 538), and then the final compensation routine (step 539) is executed. After the completion of the final compensation routine (step 539), the logic value of a maximum full discharge bit "f_fulldis" is updated with "0" (step 540), and then the process returns to the step 202 of FIG. 2.

Figure 6:
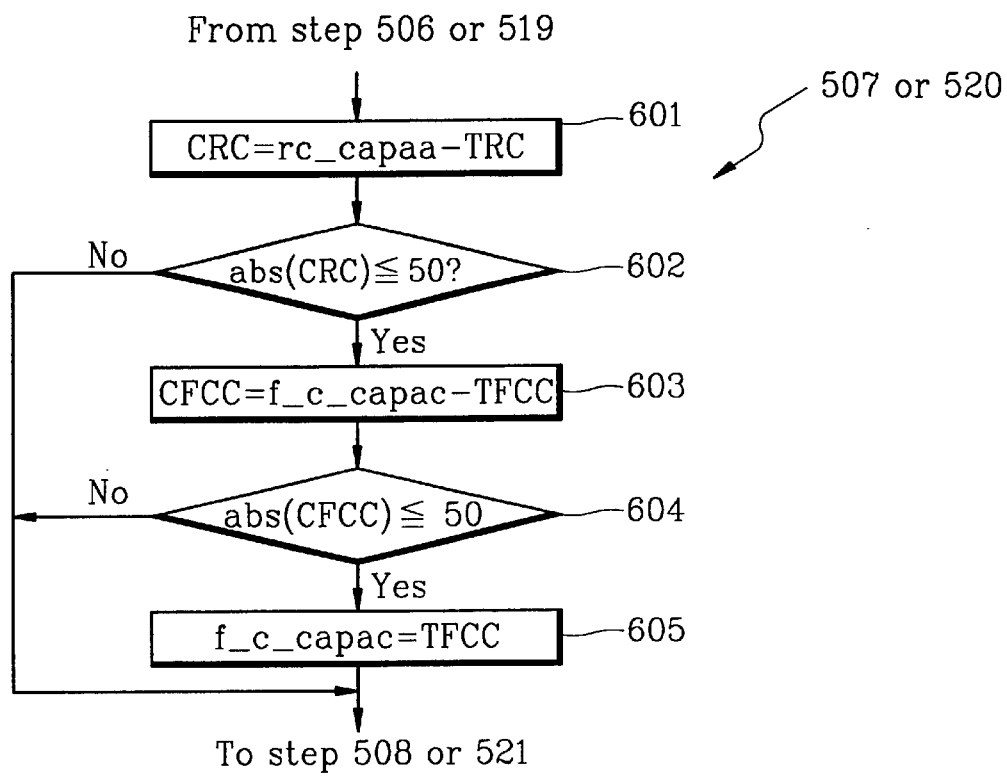
FIG. 6 is a flowchart of the preliminary compensation routine of the program shown in FIG. 5.

FIG. 6 illustrates the preliminary compensation routine (step 507 or 520) of the program of FIG. 5. Referring to FIG. 6, first a difference "CRC" between the estimated remaining capacity "rc_capaa" and the rated charge capacity "TRC" of the secondary battery 11 (see FIG. 1) is calculated (step 601). Then, the absolute difference "abs(CRC)" is compared to an upper limit value of 50 mA-h (step 602). If the absolute difference "abs(CRC)" is more than 50 mA-h, the process returns to the step 508 or 521 of FIG. 5 for preventing an operation error. However, if the absolute difference "abs (CRC)" is less than or equal to 50 mA-h, a difference "CFCC" between the reference full charge capacity "f_c_capac" for the previous period of time and the rated full charge capacity "TFCC" is calculated (step 603). Here, a rated full charge capacity "TFCC" is chosen from recorded data which are acquired from experiments and simulations according to discharge rate "d crate", present temperature "adtemp", and the number of total full discharges "ccount". Then, the absolute difference "abs(CFCC)" is compared to the upper limit value of 50 (step 604). If the absolute difference "abs(CFCC)" is more than 50 mA-h, the process returns to the step 508 or 521 of FIG. 5 for preventing an operation error. Meanwhile, if the absolute difference "abs (CFCC)" is less than or equal to 50 mA-h, the reference full charge capacity "f_c_capac" for the present period of time is updated with the rated full charge capacity "TFCC" (step 605).

Figure 7:
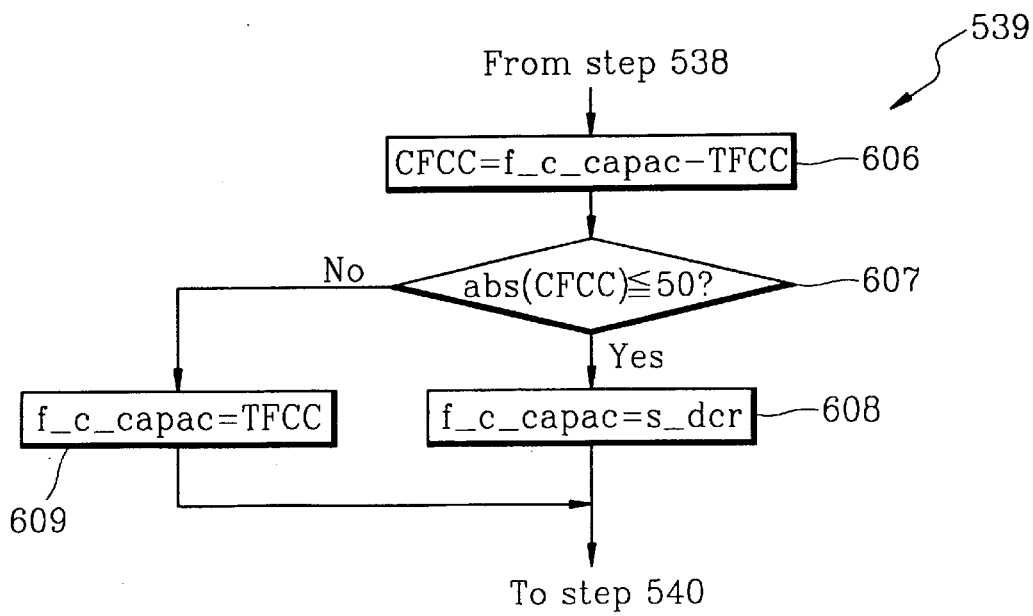
FIG. 7 is a flowchart of the final compensation routine of the program shown in FIG. 5.

FIG. 7 illustrates the final compensation routines (step 539) of FIG. 5. Referring to FIG. 7, the difference "CFCC" between the reference full charge capacity "f_c_capac" for the previous period of time and the rated full charge capacity "TFCC" is calculated (step 606). Then, the absolute difference "abs(CFCC)" is compared to the upper limit value of 50 mA-h (step 607). If the absolute difference "abs(CFCC)" is less than or equal to 50 mA-h, the reference full charge capacity "f_c_capac" for the present period of time is updated with the required full charge capacity "s_dcr" for the present period of time, and then the process moves to the step 540 of FIG. 5 (step 608). Meanwhile, if the absolute difference "abs(CFCC)" is more than 50 mA-h, the reference full charge capacity "f_c_capac" for the present period of time is updated with the rated full charge capacity "TFCC" for preventing an operation error (step 609).

As described above, in the data generating method according to the present invention, the reference full charge capacity "f_c_capac" is updated with required full charge capacity "s_dcr" which is obtained during the discharge mode. Thus, the reference full charge capacity "f_c_capac" is updated based on the discharging characteristics which vary with time, so that the charge and discharge status of the secondary battery can be monitored and controlled with accurate data. Also, the charge status of the secondary battery is determined using the average voltage value of the secondary battery, and thus more accurate data can be generated.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of generating data for use in monitoring and controlling the charge status and discharge status of a secondary battery, which is performed by a microcomputer installed in a secondary battery pack, the method comprising:

periodically calculating and updating an average voltage value, "avadvol", of a secondary battery;

executing one of a charge mode, a discharge mode, and a self-discharge mode according to amplitude and sign of an instantaneous current, "adcur", flowing through the secondary battery; and when the discharge mode is iteratively performed, periodically calculating a discharge capacity, "DCR", and updating a required full charge capacity, "s_dcr", for each iteration with the calculated discharge capacity and, if the average voltage value, "avadvol", for the present time drops below a lower limit of a full discharge voltage value, "s_edv0", updating a reference full charge capacity, "f_c_capac", with a required full charge capacity, "s_dcr", for each iteration.

2. The method of claim 1, wherein the discharge capacity, "DCR", for each iteration is the product of the instantaneous current, "adcur", flowing through the secondary battery, for an elapsed time, "Δt", for each iteration, and a discharge efficiency, "dis_eff", calculated with respect to a present temperature, "adtemp", of the secondary battery.

3. The method of claim 1, including:

comparing the average voltage, "avadvol", with a first full discharge voltage value, "s_edv1", which is higher than the lower limit of the full discharge voltage value, "s_edv0" and, if the average voltage value, "avadvol", is lower than the first full discharge voltage value, "s_edv1", comparing the average voltage value, "avadvol", with the lower limit of the full discharge voltage value, "s_edv0"; and updating the number of total full discharges, "ccount", thereby indicating remaining lifetime of the secondary battery, according to comparison of the average voltage value, "avadvol", with the first full discharge voltage value, "s_edv1", and the lower limit of the full discharge voltage value, "s_edv0".

4. The method of claim 3, wherein:

if the average voltage value, "avadvol", is lower than the first full discharge voltage value, "s_edv1", and is at least equal to the lower limit of the full discharge voltage value, "s_cdv0", calculating an absolute difference, "abs(CFCC)", between a reference full charge capacity, "f_c_capac", for a previous period of time and a rated full charge capacity, "TFCC" for the secondary battery; and if the calculated absolute difference, "abs(CFCC)", is more than a predetermined value, updating the full charge capacity, "f_c_capac", for the present period of time with the rated full charge capacity, "TFCC".

* * * * *